United States Patent
Thigpen et al.

(10) Patent No.: US 10,824,196 B1
(45) Date of Patent: Nov. 3, 2020

(54) MOBILE DEVICE DISPLAY AND INPUT EXPANSION APPARATUS

(71) Applicant: BT Idea Labs, LLC, Pasadena, CA (US)

(72) Inventors: Kevin Thigpen, Pasadena, CA (US); Jean-Pierre Boladian, Pasadena, CA (US)

(73) Assignee: BT Idea Labs, LLC, Pasadena, CA (US)

( * ) Notice: Subject to any disclaimer, the term of this patent is extended or adjusted under 35 U.S.C. 154(b) by 0 days.

(21) Appl. No.: 16/562,663

(22) Filed: Sep. 6, 2019

(51) Int. Cl.
*G06F 3/0488* (2013.01)
*G06F 1/16* (2006.01)

(52) U.S. Cl.
CPC .......... *G06F 1/1639* (2013.01); *G06F 1/1643* (2013.01); *G06F 3/04886* (2013.01)

(58) Field of Classification Search
CPC .... G06F 1/1632; G06F 1/1639; G06F 1/1643; G06F 3/01; G06F 3/0304; G06F 3/041; G06F 3/042; G06F 3/0425; G06F 3/0426; G06F 3/0488; G06F 3/04886; G06F 3/005; G06F 2203/04108
See application file for complete search history.

(56) References Cited

U.S. PATENT DOCUMENTS

| | | | |
|---|---|---|---|
| 9,160,991 B2 | 10/2015 | D'Alessio et al. | |
| 9,405,174 B2 | 8/2016 | Yakel et al. | |
| 2007/0177115 A1 | 8/2007 | Yin et al. | |
| 2010/0067181 A1 | 3/2010 | Bair et al. | |
| 2016/0109953 A1* | 4/2016 | Desh | G06F 1/163 345/169 |
| 2016/0195849 A1* | 7/2016 | Takagi | G06F 3/017 348/40 |
| 2017/0178117 A1* | 6/2017 | McClard | G06Q 20/223 |
| 2019/0130082 A1* | 5/2019 | Alameh | G06F 21/6218 |

* cited by examiner

*Primary Examiner* — Michael J Eurice
(74) *Attorney, Agent, or Firm* — Stetina Brunda Garred & Brucker (57) ABSTRACT

An input/output expander for a mobile device has a communications module connectible thereto. Output display signals from the mobile device and input signals to the mobile device are relayed between the mobile device and the bi-directional projection unit by the communications module. A display output projector is connected to the communications module, and the output display signal from the mobile device is converted to a first series of light outputs corresponding to the output display signal. The expander has a virtual keyboard projector generating a second series of light outputs corresponding to a virtual keyboard key arrangement. A key input sensor with a sensing coverage area encompassing the virtual keyboard key arrangement detects user input at specific positions thereon. A key input value corresponding to a specific key of the virtual keyboard key arrangement is generated.

22 Claims, 4 Drawing Sheets

MOBILE DEVICE DISPLAY AND INPUT EXPANSION APPARATUS

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Technical Field

The present disclosure relates generally to multi-purpose mobile computing devices, and more particularly, to an apparatus for expanding the input and display output capabilities of mobile devices.

2. Related Art

A variety of personal computing devices spanning a wide range of form factors are available, with each fulfilling specific needs and applications. Evolved from general-purpose desktop computers, notebook/laptop computers feature a clamshell form factor with a base portion incorporating the processor, memory, storage, and peripheral input/output ports. A keyboard and/or a trackpad or other like graphical user interface input modality may be disposed on the interior face of the base clamshell portion. The other half of the clamshell may be dedicated to the display. Such notebook computers are loaded with desktop-class operating systems and software applications, and has local area networking connectivity over Ethernet and WiFi.

At the other end of the portability spectrum are smartphones that combine the features of earlier cellular phones and personal digital assistants. Such devices are equipped with a general purpose data processor that executes pre-programmed instructions. Although differences between processors utilized in mobile devices and those utilized in desktop and notebook class personal computers are becoming less, earlier mobile processors were lower powered due to limited battery capacity, small form factors, and so on.

A fundamental design consideration of a smartphone is communications, so a typical smartphone incorporates multiple communications modules. These include longer range cellular network modalities such as GSM (Global System for Mobile Communications), UMTS (Universal Mobile Telecommunications System, EDGE (Enhanced Data Rates for GSM Evolution)/LTE (Long Term Evolution), 5G, and the like. For connecting to wireless local area networks, smartphones may also incorporate a Wi-Fi module, while a Bluetooth module may be included for connecting to peripheral devices such as headsets, speakers, smartwatches, activity monitors, and the like over short distances.

The processor cooperates with multiple input/output devices, including combination touch input display screens, audio components such as speakers, microphones, and related integrated circuits, GPS modules, physical buttons/input modalities, and cameras. Recent devices also include accelerometers, magnetometers, barometers, gyroscopes and other physical sensors that can sense motion and direction to provide as inputs to an interactive software application.

The processor core or cores, the wireless modems implementing the communications modalities, along with graphics processing units and other dedicated processors for such functions as security, image processing, and so on, may be incorporated into a single system-on-chip (SoC). One example of a SoC platform is the Qualcomm Snapdragon system. The management of the aforementioned hardware components is performed by a mobile operating system. The mobile operating system provides several fundamental software modules and a common input/output interface that can be used by third party applications via application programming interfaces. One widely utilized mobile operating system is Google Android.

The tablet is another popular mobile device form factor. Tablets typically utilize the same hardware and software components of a smartphone, that is, the same SoC system, the same operating system, and run the same software, except with the display and overall device size being larger than a smartphone. Like the smartphone, tablets have a slate form factor that have few, if any, physical buttons, with the touch display screen occupying much of the front face of the device.

User interaction with these mobile devices, including the invoking of the functionality of these applications and the presentation of the results therefrom, is, for the most part, restricted to the graphical touch user interface. That is, the extent of any user interaction is limited to what can be displayed on the screen, and the inputs that can be provided to the touch interface are similarly limited to what can be detected by the touch input panel. Touch interfaces accept user inputs in the form of tapping, sliding, flicking, and pinching regions of the sensor panel overlaying the displayed graphical elements with one or more fingers. The graphical user interface may responsively generate corresponding animated display reactions thereto.

While the availability of productivity software applications for tablets, smartphones, and other mobile platforms are almost on par with those available for personal computers, the smaller form factor of the mobile devices tend to limit their use in such applications. Personnel who must continue to work and use productivity applications while traveling out of the office/home office, such as sales professionals visiting customers and prospective customers, therefore must carry the entire range of computing devices. At a bare minimum, the smartphone is likely needed for telephone calls and sending/receiving e-mails, SMS (Short Messaging Service) or other instant messaging text messages, and/or workplace collaboration messages, and basic personal digital assistant-type functions such as calendaring and to-do lists. The notebook computer may be needed for research, document generation, and presentation purposes, while a tablet (with a digitizer, stylus, or other pen-style input device) may be utilized for reviewing and signing documents.

Each of additional device that must be carried is another weight burden, so there is a need in the art for reducing the overall number of computing devices that a knowledge worker utilizes to continue working with optimal productivity. With the computing power incorporated into conventional smartphones, it would be desirable to utilize the same for the entire range of computing tasks while circumventing the reduced form factor limitations impacting inputs and display outputs.

BRIEF SUMMARY

The present disclosure provides an apparatus for leveraging a single device, that is, a smartphone or other mobile communications device as a primary computer, instead of using a laptop or similar device that integrates multiple components such as the processor, the video card, and others that are largely redundant with those corresponding components in the mobile device. Accordingly, users need not be restricted to a single laptop or desktop computer, and simply utilize the smartphone as the single computing device while expanding the display output to a larger area, and expanding the input capabilities to a larger, virtual keyboard arrangement. Various embodiments of the present disclosure are contemplated to provide cost savings to users, and security problems can be minimized because the processing unit is physically separable from the display and input modalities when not being used. Additionally, added convenience to end users may be achieved since the single device involved, e.g., the smartphone, is ubiquitous in the conventional technology ecosystem.

One embodiment of the present disclosure is directed to a mobile device input and output display expansion apparatus. There may be a clamshell structure including a first section in a hinged relationship to a second section. The first section may define a flat display projection surface, while the second section may define a docking recess and a keyboard projection surface. The apparatus may also include a bi-directional projection unit, which may have a communications module that is connectible to a mobile device. Output display signals from the mobile device and input signals to the mobile device may be relayed between the mobile device and the bi-directional projection unit by the communications module. The bi-directional projection unit may also include a display output projector connected to the communications module. The output display signal from the mobile device may be converted to a first series of light outputs corresponding to the output display signal and projected against the flat display projection surface of the clamshell structure. There may also be a virtual keyboard projector that generates a second series of light outputs corresponding to a virtual keyboard key arrangement and projected against the keyboard projection surface of the second section of the clamshell structure. The bi-directional projection unit may further incorporate a key input sensor that covers the virtual keyboard key arrangement to detect haptic input at specific positions along the virtual keyboard key arrangement. The key input sensor may generate a key input value corresponding to a specific key of the virtual keyboard key arrangement at which the haptic input is detected. Furthermore, the key input value may be relayed to the mobile device by the communications module. The bi-directional projection unit may also include a housing at least partially received in the docking recess. The housing may be defined by a first edge with a display projector aperture to the display output projector. The housing may also be defined by an opposed second edge with a keyboard projection aperture to the virtual keyboard projector and an input sensor aperture to the key input sensor.

According to another embodiment of the present disclosure, there may be an input/output expander for a mobile device. The expander may have a communications module connectible to the mobile device. Output display signals from the mobile device and input signals to the mobile device may be relayed between the mobile device and the bi-directional projection unit by the communications module. There may also be a display output projector that is connected to the communications module. The output display signal from the mobile device may be converted to a first series of light outputs corresponding to the output display signal. The expander may also include a virtual keyboard projector generating a second series of light outputs corresponding to a virtual keyboard key arrangement. There may further be a key input sensor that defines a sensing coverage area encompassing a projection of the virtual keyboard key arrangement to detect user input at specific positions thereon. The key input sensor may generate a key input value corresponding to a specific key of the virtual keyboard key arrangement at which the user input is detected. The key input value, in turn, may be relayed to the mobile device by the communications module.

Yet another embodiment of the present disclosure contemplates a mobile communications device received within an input/output expander. The mobile communications device may include a data processor and a device housing defined by a front face and a plurality of edges. A primary display may be mounted to the device housing as a part of the front face thereof. There may also be a display output projector connected to the data processor. An output display signal from the processor may be converted to a first series of light outputs corresponding to the output display signal. An output window of the display output projector may be defined in a first one of the plurality of edges of the device housing. The mobile communications device may further include a virtual keyboard projector that generates a second series of light outputs corresponding to a virtual keyboard key arrangement. An output window of the virtual keyboard projector may be defined in a second one of the plurality of edges of the device housing. Furthermore, there may be a key input sensor that defines a sensing coverage area encompassing a projection of the virtual keyboard key arrangement to detect user input at specific positions thereon. The key input sensor may generate a key input value corresponding to a specific key of the virtual keyboard key arrangement at which the user input is detected. The key input value may be passed to the data processor. A sensor window of the key input sensor may also be defined in the second one of the plurality of edges of the device housing.

The present disclosure will be best understood accompanying by reference to the following detailed description when read in conjunction with the drawings.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

The detailed description set forth below in connection with the appended drawings is intended as a description of the several presently contemplated embodiments of a mobile device display and input expansion apparatus and is not intended to represent the only form in which such embodiments may be developed or utilized. The description sets forth the functions and features in connection with the illustrated embodiments. It is to be understood, however, that the same or equivalent functions may be accomplished by different embodiments that are also intended to be encompassed within the scope of the present disclosure. It is further understood that the use of relational terms such as first and second and the like are used solely to distinguish one from another entity without necessarily requiring or implying any actual such relationship or order between such entities.

Figure 1:
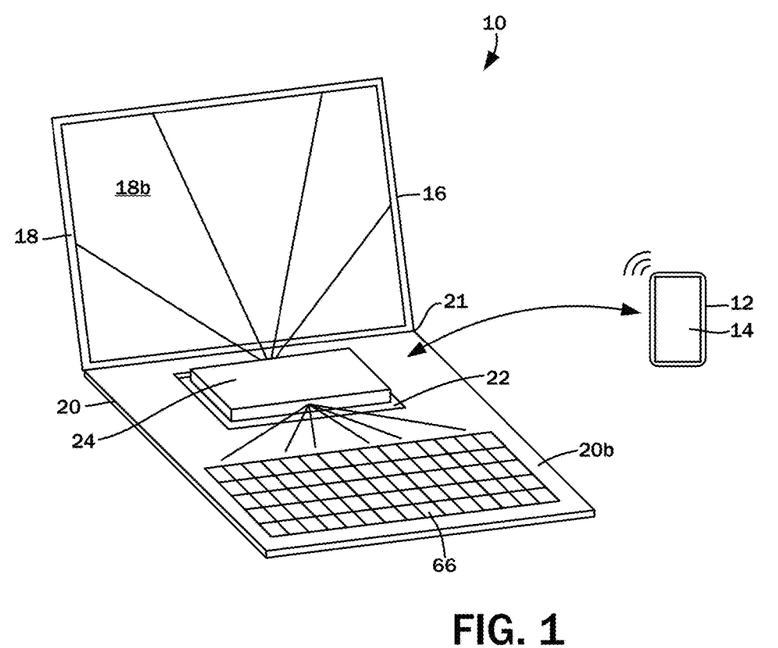
FIG. 1 illustrates a mobile device input and output display expansion apparatus in accordance with one embodiment of the present disclosure.

With reference to FIG. 1, one embodiment of the present disclosure is directed to a mobile device input and output display expansion apparatus 10. In accordance with this illustrated embodiment, the apparatus 10 communicates with a mobile device 12, and expands the output and input capabilities of the mobile device 12. The mobile device 12 is understood to be a smartphone, tablet, or other like mobile communications device with a smaller physical footprint, though incorporating a range of data processing and communications features.

The mobile device 12 incorporates a general-purpose data processor that executes pre-programmed software instructions that are loaded into an onboard memory module. There may be non-volatile memory on which software and other data are stored. Such software instructions correspond to various software applications such as e-mail, word processing, web browsing, and slideshow presentation. Such data processor may be part of a system-on-chip (SoC) mobile platform such as the Qualcomm Snapdragon discussed earlier, which additionally includes dedicated graphics processors, a wireless modem, a digital signal processor and other input/output functionalities, and so on. Utilizing the general-purpose wireless modem as the base, various short-range wireless communications and cellular communications may be implemented. Typical mobile devices 12 implement one or more versions of WiFi and Bluetooth, along with mobile communications such as GSM (Global System for Mobile communications) and others also discussed above.

As an intermediate layer between the hardware and the user software applications, the mobile device 12 may have an operating system installed thereon that manages all of the onboard hardware devices and provide a consistent application programming interface thereto. One example operating system is the Google Android, though devices with Apple iOS may be substituted. Additional specifics of the mobile device 12 will be omitted, as those having ordinary skill in the art will readily appreciate the myriad of features and functionalities that may be incorporated therein.

The face of the mobile device 12 is dominated by a touch display screen 14, which serves as both the primary output and primary input for the mobile device 12. The touch display screen 14 may be implemented with an underlying light emitting diode display, on which a capacitive sensor matrix is overlaid. Despite the display occupying almost the entirety of the mobile device 12, the size limitations of the device itself may restrict visibility of the graphics display. Inputting text data is typically achieved via an on-screen keyboard, which may occupy up to a quarter or a third of available screen real estate. Again because of the smaller device size, typing on on-screen keyboards may be limited to the thumbs, rather than all ten fingers. Other inputs to invoke the functionality of the software applications may be provided by on-screen buttons, icons, and the like. However, the limited screen real estate involves particular graphical user interface design considerations specific thereto.

Figures 2, 3:
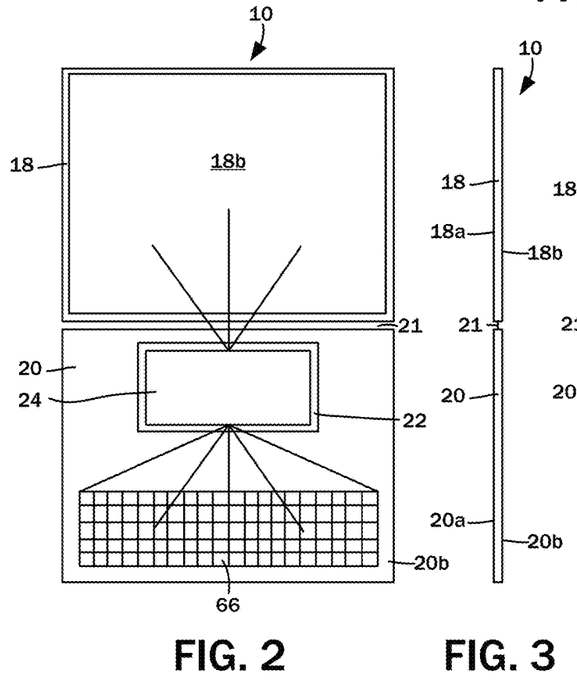
FIG. 2 is a top plan view of clamshell panels utilized in the mobile device input and output display expansion apparatus with a projection unit positioned therein.
FIG. 3 is a side view of the clamshell panels utilized in the mobile device input and output display expansion apparatus.
Figure 4:
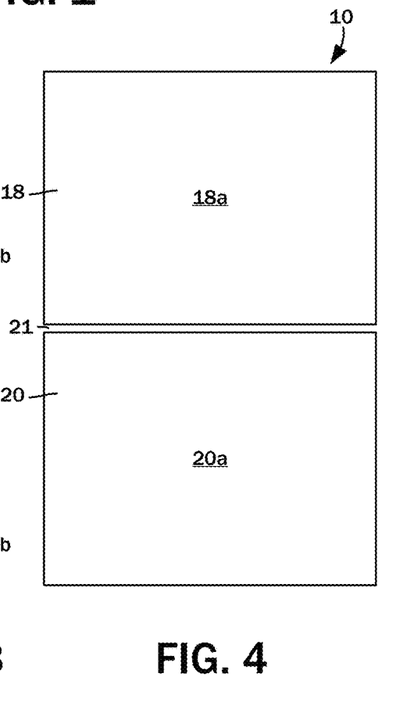
FIG. 4 is bottom plan view of the clamshell panels.

With the improved processing capabilities of the mobile device 12, it is contemplated to be used for functions typically requiring laptop or desktop computers. The input and output capabilities of the mobile device 12 continue to be limiting factors, though with the mobile device input and output display expansion apparatus 10 of the present disclosure, such limitations may be avoided. As illustrated in FIGS. 1, 2, and 3, the apparatus includes a clamshell panel or structure 16 with a first section 18 that is in a hinged relationship to a second section 20. That is, the first section 18 is rotatably connected to the second section 20 with a hinge section 21. According to one embodiment, the hinge section 21 is a resiliently flexible material connected to the first section 18 and the second section 20. However, any other hinge structure that allows the first section 18 to be fixed at a desired angle relative to the second section 20 while being foldable with a sufficient amount of force may be readily substituted without departing from the present disclosure. The hinge section 21 may have a sufficient articulation range to enable the first section 18 to close upon the second section 20, reducing the overall footprint to that of first section 18 or the second section 20 by itself.

Both the first section 18 and the second section 20 have a generally rectangular shape, with each including a rear cover surface 18a, 20a, and an opposite front display surface 18b, 20b. The front display surface 18b of the first section 18 may also be referred to as a flat display projection surface because, as will be described in further detail below, the display output is projected thereto. Likewise, the front display surface 20b of the second section 20 may be referred to as a keyboard projection surface because the virtual keyboard is projected thereto. The first section 18 and the second section 20 may be constructed of a thin, rigid plastic material, or metal. In a preferred, though optional embodiment, the thickness of the material used for the first section 18 and the second section 20 may be 1/16" to 3/16" thick. These structural features, including the rectangular shape of the first section 18 and the second section 20, are presented by way of example only and not of limitation. Other profiles such as a flattened oblong shape, flattened egg, or any other flattened shape may be substituted without departing from the scope of the present disclosure.

The second section 20 further defines a docking recess 22 that accepts a bi-directional projection unit 24. The docking recess 22 may be sized and shaped to correspond to that of the bi-directional projection unit 24. Other embodiments of the present disclosure contemplate the mobile device 12 itself being the bi-directional projection unit, or a peripheral device that attaches to or is fitted to the mobile device 12. In such embodiments, the docking recess 22 is understood to be sized and shaped for mobile device 12 or the peripheral device. The second section 20 of the clamshell structure 16 may also incorporate locking mechanisms to retain the bi-directional projection unit beyond just frictional retention. Those having ordinary skill in the art will recognize that a variety of locking mechanisms may be utilized.

Figure 5A:
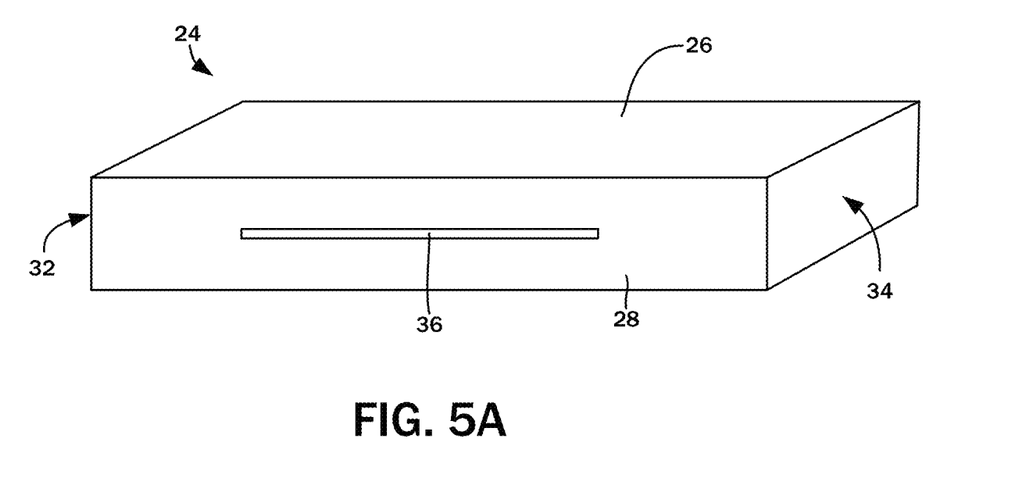
FIG. 5A is a front perspective view of a projection unit in accordance with one embodiment of the present disclosure.
Figure 5B:
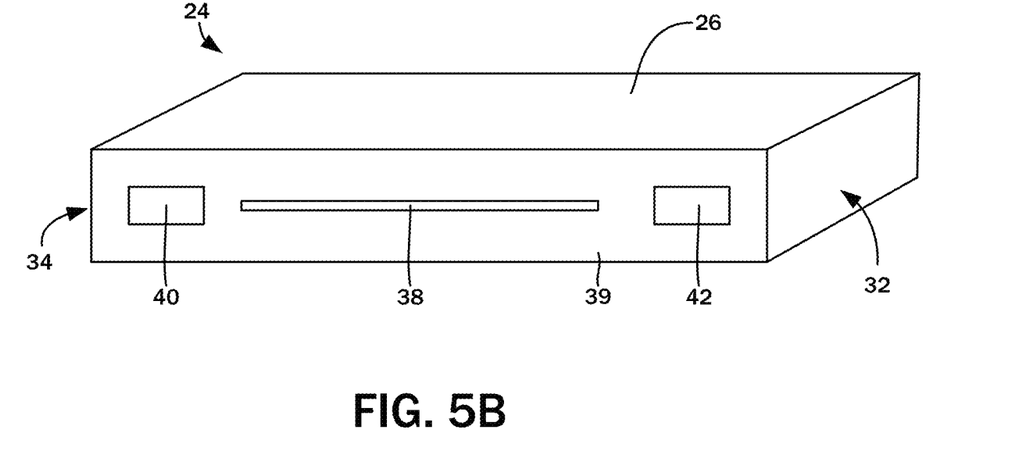
FIG. 5B is a rear perspective view of the projection unit.

Referring now to FIGS. 5A and 5B, the bi-directional projection unit 24 has a housing 26 with a rectangular in an exemplary configuration. There is a first lengthwise edge wall 28 and an opposed second lengthwise edge wall 30. Furthermore, there is a left sidewall 32 and an opposed right sidewall 34, each of which are perpendicular to the first lengthwise edge wall 28 and the second lengthwise edge wall 30. The first lengthwise edge wall 28 defines a first projector aperture 36 to a display output projector. The first projector aperture 36 and the display output projector behind it faces the front display surface 18b of the clamshell structure 16 when the bi-directional projection unit 24 is positioned within the docking recess 22. The second lengthwise edge wall 30 defines a virtual keyboard projection aperture 38, a first sensor aperture 40 toward the right sidewall 34 and a second sensor aperture 42 toward the opposite left sidewall 32. Behind the virtual keyboard projection aperture 38 is a virtual keyboard projector facing the front display surface 20b of the clamshell structure 16.

Figure 6:
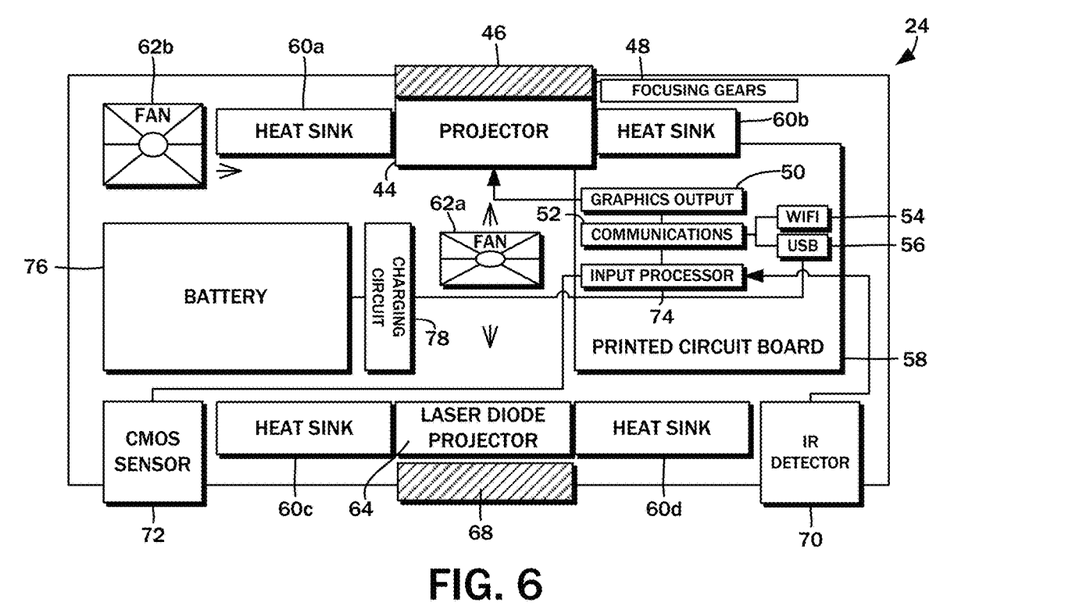
FIG. 6 is a block diagram of a first embodiment of the projection unit.

With additional reference to the block diagram of FIG. 6, the bi-directional projection unit 24 includes a pico projector 44, which corresponds to the aforementioned display output projector. The pico projector 44 is understood to generate a first series of light outputs corresponding to the display video from a video source. A variety of technologies may be utilized to implement the pico projector 44, including an imager that converts an electronic signal corresponding to the display output to drive a series of laser or LED light sources, with individual color light emissions that are combined with a combiner optic. There are several well-known types of imagers known in the art, including Digital Light Processing (DLP) from Texas Instruments, laser beam steering, and liquid crystal on silicon.

The light output from the pico projector 44 is passed through an additional diffractive optical element 46. The focus of the diffractive optical element 46 may be adjusted by a set of focusing gears 48. The diffractive optical element 46 is understood to be aligned with the first projector aperture 36 defined on the first lengthwise edge wall 28 of the housing 26. The light outputs from the pico projector 44 are thus projected against the flat display projection surface of the clamshell structure 16, that is, the front display surface 18b. The focus distance may be different depending on the articulated position of the first section 18 relative to the second section 20, so the focusing gears 48 are understood to compensate for any variations. The focusing gears 48 may be manually manipulated for a desired focus, though automated focusing with additional sensors (infrared for distance measurement, or image capture for phase detection or contrast detection) may also be implemented.

Before the light output is generated, the electrical signal that is converted to the light output by the pico projector 44 may be generated from a graphics output processor 50. Such electrical signals may be generated from a video output signal from a source, e.g., the mobile device 12. In this regard, the bi-directional projection unit 24 may also include a communications module 52 with a modem having both wireless and wired connection interfaces. One possible wireless interface is WiFi and therefore there may be a WiFi transceiver 54, while one possible wired interface is USB (Universal Serial Bus) and therefore there may be a USB module 56. A standard USB-A, B, or C type socket may be incorporated, to accept a corresponding USB plug that is the terminus of an input/output link cable. Alternative physical interfaces between the USB module 56 and the mobile device 12 may be readily substituted without departing from the present disclosure.

According to one embodiment, the mobile device 12 transmits a video output stream that is received by the communications module 52, and such stream may, in turn, be converted to the electrical signals corresponding to the video by the graphics output processor 50. The connection interfaces and the integrated circuits that implement these modules may be mounted to a printed circuit board 58.

The pico projector 44 is mounted to, or adjacent or otherwise in proximity to a pair of thermal conductors or heat sinks 60a, 60b to transfer away the heat generated thereby. The heated air in the housing 26 may be moved out the interior by one or more fans 62. In an exemplary embodiment, there may be a first fan 62a located centrally in the interior of the housing 26, and a second fan 62b located toward the left sidewall 32 adjacent to the heat sink 60a.

Having considered the features of the apparatus 10 that expand the output display capabilities of the mobile device 12, the features that expand the input capabilities will now be considered. Still referring to the diagram of FIG. 6, there is a laser diode projector 64 that corresponds to the aforementioned virtual keyboard projector. The laser diode projector 64 generates a second series of light outputs corresponding to a virtual keyboard key arrangement 66. Specifically, as shown in FIGS. 1 and 2, this is understood to be an arrangement of columns and rows of keys that are the same as a conventional keyboard. Each block is understood to correspond to a specific character key, and the boundaries between each block are generated by the laser diode projector 64. The light outputs of the virtual keyboard are projected against a keyboard projection surface of the second section 20 of the clamshell structure 16, that is, the front display surface 20b. In this regard, there may be another set of diffractive optic elements 68 aligned with the output end of the laser diode projector 64 and the virtual keyboard projection aperture 38 defined in the second lengthwise edge wall 30 of the housing 26.

One embodiment contemplates a virtual keyboard key arrangement 66 that remains static and no changes are possible to the size, shape, and layout of virtual keys. Accordingly, for such embodiment, the laser diode projector 64 may be pre-programmed for this specific arrangement, and no communication with the mobile device 12 is necessary. However, alternative embodiments also contemplate the ability for a user to change the arrangement of the virtual keys, e.g., changing from a QWERTY to a Dvorak style keyboard, changing between region or language specific key characters and arrangements, or changing between PC-style Alt/Ctrl/Paste/Function key arrangements and Mac-style Alt/Ctrl/Command key arrangements. In such configurations, the multiple display outputs for the different virtual keyboard key arrangement may be stored in an separate integrated circuit module connected to the laser diode projector and selected via a command transmitted through the communications module 52. Still further, like the graphics output processor 50, the mobile device 12 may dictate what is being output by the laser diode projector 64 at any given time. Alternative configurations besides the foregoing may also be implemented without departing from the scope of the present disclosure.

Like the pico projector 44, the laser diode projector 64 may be mounted to a pair of thermal conductors or heat sinks 60c, 60d to transfer away the heat generated thereby. The heated air in the housing 26 may be moved out the interior by the centrally located first fan 62a.

With the virtual keyboard key arrangement 66 projected on to the front display surface 20b, it is possible for the user to input keystrokes by placing finger at a given one of the locations at which the corresponding virtual key is being projected. The break in the laser projection is detected by a key input sensor or more specifically the IR detector 70. The key input sensor generates a key input value that correspond to a key of the virtual keyboard key arrangement 66 at which the user haptic input is detected. This input key input value, in turn, is passed to the communications module 52 for transmission to the mobile device 12. The IR detector 70 is positioned within the housing 26 to be aligned with the second sensor aperture 42.

The first sensor aperture 40, on the other hand, is aligned with a CMOS imaging sensor 72, which captures a sequence of images within its field of view, e.g., the virtual keyboard key arrangement 66. The images captured by the CMOS imaging sensor 72 may be processed to determine when and which keys were activated, and transmits the information as a key input value to the mobile device 12 via the communications module 52.

The IR detector 70 and the CMOS imaging sensor 72 are understood to generate signal and/or data corresponding to the haptic input without further processing as to what specific key of the virtual keyboard key arrangement 66 was "pressed." These signals/data are passed to an input processor 74 that applies a series of processing steps to determine the specific key press. The input processor 74 may then generate a standard (ASCII) key value that corresponds to the detected key press, and passes the same to the communications module 52 for transmission to the mobile device 12.

According to an embodiment of the present disclosure, the components of the bi-directional projection unit 24, e.g., the pico projector 44, the laser diode projector 64, associated circuitry including the graphics output processor 50, the communications module 52, and the input processor 74, as well as the fans 62 may be powered by an onboard battery 76. There may also be a charging circuit 78 that charges the onboard battery 76 via a separate connection or via the USB module 56. As will be described in the context of alternative embodiments, however, the onboard battery 76 is optional.

Figure 7:
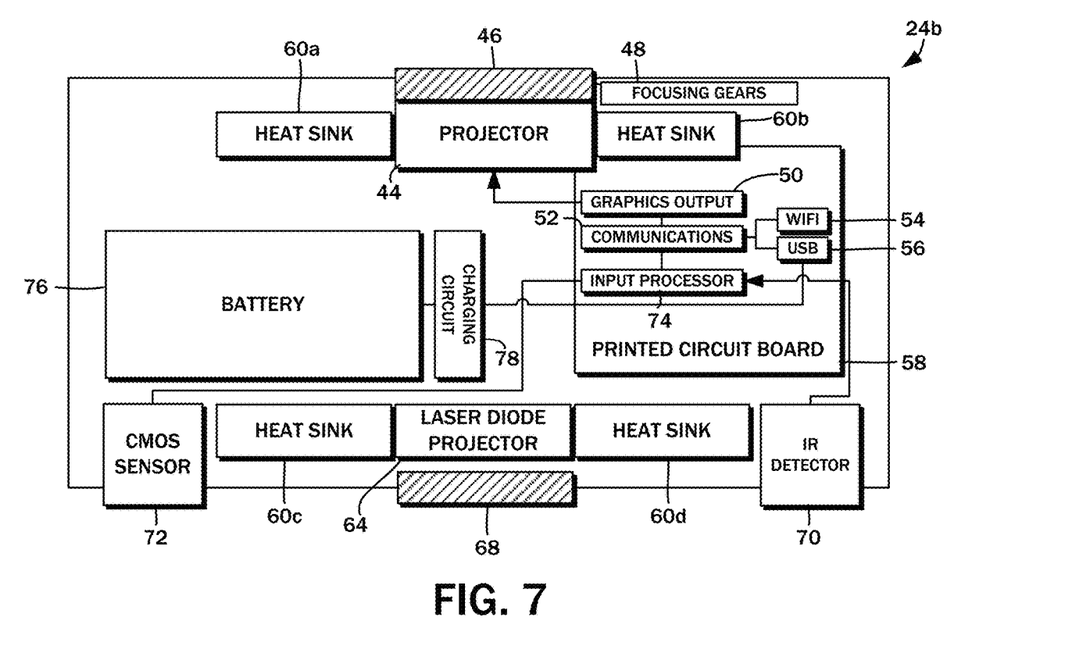
FIG. 7 is a block diagram of a second embodiment of the projection unit that omits cooling fans.

FIG. 7 illustrates a second embodiment 24b of the bi-directional projection unit that likewise includes the pico projector 44 that generates a first series of light outputs corresponding to the display video from a video source. Like the first embodiment discussed above, the light output from the pico projector 44 is passed through the additional diffractive optical element 46. The focus of the diffractive optical element 46 may be adjusted by the focusing gears 48. The diffractive optical element 46 is aligned with the first projector aperture 36 defined on the first lengthwise edge wall 28 of the housing 26. The light outputs from the pico projector 44 are projected against the front display surface 18b.

The light output is generated by the pico projector 44 from an electrical signal that is generated by the graphics output processor 50, which in turn are generated from the video output from a source such as the mobile device 12. The communications module 52 is the modality by which the video output is transferred from the mobile device 12 and includes the WiFi transceiver 54 and the USB module 56. In further detail, the mobile device 12 transmits a video output stream that is received by the communications module 52, and such stream is converted to the electrical signals corresponding to the video by the graphics output processor 50. The connection interfaces and the integrated circuits that implement these modules may be mounted to the printed circuit board 58.

The second embodiment of the bi-directional projection unit 24 similarly includes the laser diode projector 64 that generates the second series of light outputs corresponding to a virtual keyboard key arrangement 66. The light outputs of the virtual keyboard are projected against the front display surface 20b, also referred to as the keyboard projection surface of the second section 20 of the clamshell structure 16. The set of diffractive optic elements 68 are aligned with the output end of the laser diode projector 64 and the virtual keyboard projection aperture 38 defined in the second lengthwise edge wall 30 of the housing 26.

The second embodiment of the bi-directional projection unit 24b also incorporates the IR detector 70 and the CMOS imaging sensor 72 that determines key inputs that are captured by the input processor 74 and relayed to the mobile device 12 by the communications module 52. Again, it is understood that the break in the laser projection from the laser diode projector 64 is detected by the IR detector 70, and the CMOS imaging sensor 72 captures a sequence of images within its field of view that are processed to determine the haptic inputs upon the virtual keyboard key arrangement 66. The IR detector 70 is positioned within the housing 26 to be aligned with the second sensor aperture 42, while the CMOS imaging sensor 72 is positioned to be aligned with the first sensor aperture 40.

In this embodiment, the components of the bi-directional projection unit 24b, e.g., the pico projector 44, the laser diode projector 64, associated circuitry including the graphics output processor 50, the communications module 52, and the input processor 74 are powered by the onboard battery 76. There may also be a charging circuit 78 that charges the onboard battery 76 via a separate connection or via the USB module 56.

The pico projector 44 is mounted to a pair of thermal conductors or heat sinks 60a, 60b to transfer away the heat generated thereby. Likewise, the laser diode projector 64 is mounted to a pair of thermal conductors 60c, 60d, to transfer away the heat generated thereby. Unlike the first embodiment discussed above, however, the second embodiment does not include any fans, and relies entirely on the heat sinks 60 and it direct or indirect thermal conduction to ambient air.

Figure 8:
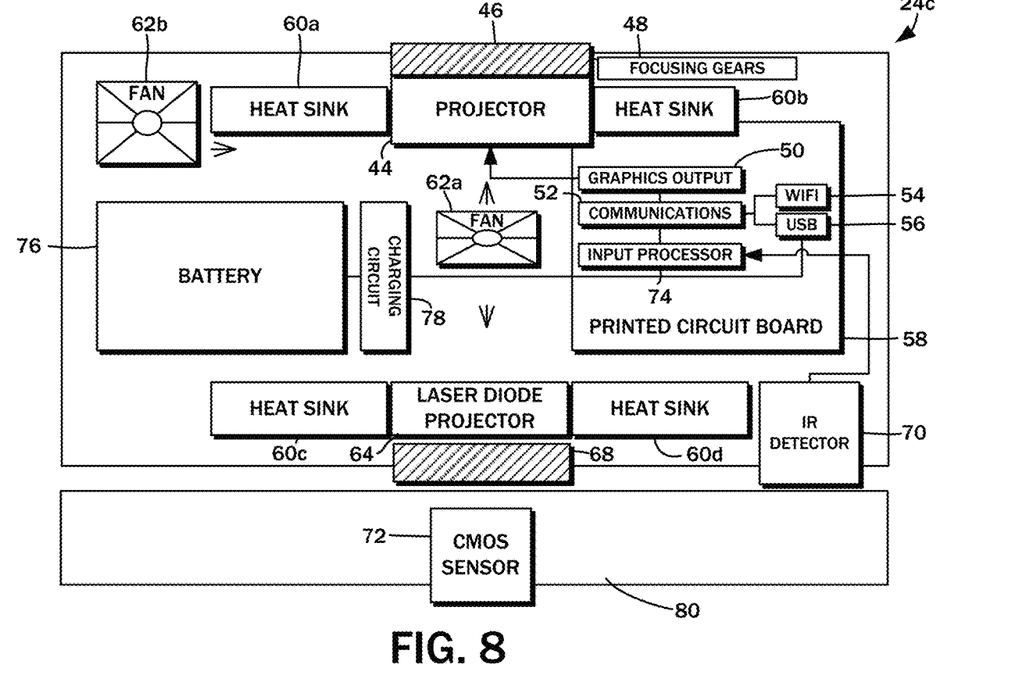
FIG. 8 is a block diagram of a third embodiment of the projection unit that includes an external key input sensor.

FIG. 8 illustrates a third embodiment 24c of the bi-directional projection unit, which also incorporates the pico projector 44 that generates a first series of light outputs corresponding to the display video from a video source. Like the first and second embodiments discussed above, the light output from the pico projector 44 is passed through the additional diffractive optical element 46, and the focus of the diffractive optical element 46 can be adjusted by the focusing gears 48. The diffractive optical element 46 is aligned with the first projector aperture 36 defined on the first lengthwise edge wall 28 of the housing 26. The light outputs from the pico projector 44 are projected against the front display surface 18b.

As with the earlier described embodiments of the bi-directional projection unit 24, the light output is generated by the pico projector 44 from an electrical signal that is generated by the graphics output processor 50, which in turn are generated from the video output from a source such as the mobile device 12. The video output is transferred from the mobile device 12 by the communications module 52, which includes the WiFi transceiver 54 and the USB module 56. The mobile device 12 transmits a video output stream that is received by the communications module 52, and such stream is converted to the electrical signals corresponding to the video by the graphics output processor 50. The connection interfaces and the integrated circuits that implement these modules may be mounted to the printed circuit board 58.

The third embodiment of the bi-directional projection unit 24 similarly includes the laser diode projector 64 that generates the second series of light outputs corresponding to a virtual keyboard key arrangement 66. The light outputs of the virtual keyboard are projected against the front display surface 20b, and specifically the keyboard projection surface of the second section 20 of the clamshell structure 16. The set of diffractive optic elements 68 are aligned with the output end of the laser diode projector 64 and the virtual keyboard projection aperture 38 defined in the second lengthwise edge wall 30 of the housing 26.

The third embodiment of the bi-directional projection unit 24c also incorporates the IR detector 70 that determines key inputs that are captured by the input processor 74 and relayed to the mobile device 12 by the communications module 52. The user inputs keystrokes by placing finger at a given one of the locations at which the corresponding virtual key is being projected. The break in the laser projection is detected by a key input sensor or more specifically the IR detector 70. The IR detector 70 is positioned within the housing 26 to be aligned with the second sensor aperture 42.

Unlike the other embodiments, the CMOS imaging sensor 72 is mounted to a separate platform 80 that may be raised above the plane of the housing 26. As with the other embodiments, the CMOS imaging sensor 72 captures a sequence of images within its field of view, e.g., the virtual keyboard key arrangement 66, with those captured images being processed to determine when and which keys were activated. The information may be transmitted as a key input value to the mobile device 12 via the communications module 52.

As discussed above, the IR detector 70 and the CMOS imaging sensor 72 generates signal and/or data corresponding to the haptic input without further processing as to what specific key of the virtual keyboard key arrangement 66 was "pressed." These signals/data are passed to the input processor 74 that applies a series of processing steps to determine the specific key press.

The pico projector 44 is mounted to a pair of thermal conductors or heat sinks 60a, 60b to transfer away the heat generated thereby. Similarly, the laser diode projector 64 is mounted to a pair of thermal conductors or heat sinks 60c, 60d to transfer away the heat generated thereby. The heated air in the housing 26 may be moved out the interior by one or more fans 62, including the first fan 62a located centrally in the interior of the housing 26, and the second fan 62b located toward the left sidewall 32 adjacent to the heat sink 60a.

Like the first and second embodiments discussed above, the components of the third embodiment of the bi-directional projection unit 24c, e.g., the pico projector 44, the laser diode projector 64, associated circuitry including the graphics output processor 50, the communications module 52, the input processor 74, the IR detector 70, and the CMOS imaging sensor 72 are powered by the onboard battery 76. The charging circuit 78 is understood to charge the onboard battery 76 via a separate connection or via the USB module 56.

Figure 9:
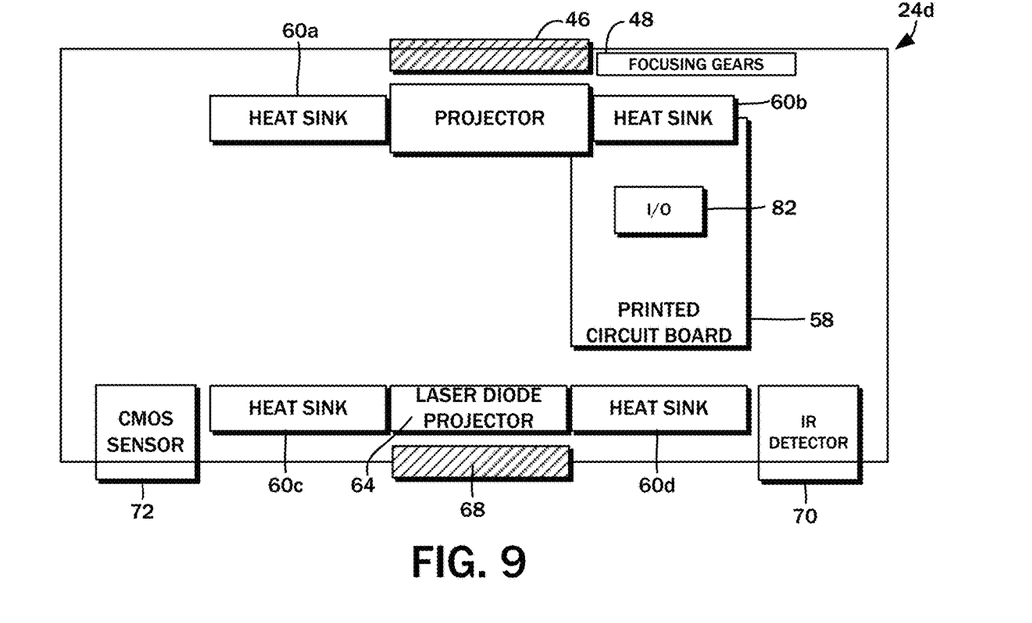
FIG. 9 is a block diagram of a fourth embodiment of the projection unit that connects directly to a mobile device for power and graphics output.

FIG. 9 illustrates a fourth embodiment 24d of the bi-directional projection unit, which also incorporates the pico projector 44 that generates a first series of light outputs corresponding to the display video from a video source. Like the first, second, and third embodiments discussed above, the light output from the pico projector 44 is passed through the additional diffractive optical element 46, and the focus of the diffractive optical element 46 can be adjusted by the focusing gears 48. The diffractive optical element 46 is aligned with the first projector aperture 36 defined on the first lengthwise edge wall 28 of the housing 26. The light outputs from the pico projector 44 are projected against the front display surface 18b.

As with the earlier described embodiments of the bi-directional projection unit 24, the light output is generated by the pico projector 44. In this embodiment, however, the bi-directional projection unit 24 is incorporated into the mobile device 12, or itself includes a dock that physically connects to the mobile device 12. Power for the various electronic components are provided by the mobile device 12, and the mobile device connects directly to the pico projector 44 as another output display. Accordingly, no other graphics processor circuit is necessary, or a communications module with various network/data transmission capabilities. There is an input/output interface 82 that is connected to the pico projector 44, the laser diode projector 64, the IR detector 70, and the CMOS imaging sensor 72. The input/output interface 82 is understood to be connectible to a corresponding interface on the mobile device 12.

The input functionalities of the mobile device 12 are expanded by the same laser diode projector 64 that generates the second series of light outputs corresponding to a virtual keyboard key arrangement 66. The light outputs of the virtual keyboard are projected against the front display surface 20b, and specifically the keyboard projection surface of the second section 20 of the clamshell structure 16. The set of diffractive optic elements 68 are aligned with the output end of the laser diode projector 64 and the virtual keyboard projection aperture 38 defined in the second lengthwise edge wall 30 of the housing 26.

The fourth embodiment of the bi-directional projection unit 24d also incorporates the IR detector 70 and the CMOS imaging sensor 72 that determines key inputs that are captured by the input processor 74 and relayed to the mobile device 12 by the communications module 52. Again, it is understood that the break in the laser projection from the laser diode projector 64 is detected by the IR detector 70, and the CMOS imaging sensor 72 captures a sequence of images within its field of view that are processed to determine the haptic inputs upon the virtual keyboard key arrangement 66. The IR detector 70 is positioned within the housing 26 to be aligned with the second sensor aperture 42, while the CMOS imaging sensor 72 is positioned to be aligned with the first sensor aperture 40.

The pico projector 44 is mounted to a pair of thermal conductors or heat sinks 60a, 60b to transfer away the heat generated thereby. The laser diode projector 64 is mounted to a pair of thermal conductors or heat sinks 60c, 60d to transfer away the heat generated thereby. Similar to the second embodiment discussed above, however, the fourth embodiment does not include any fans, and relies entirely on the heat sinks 60 and it direct or indirect thermal conduction to ambient air.

Regardless of the variations in the bi-directional projection unit 24 discussed above, the present disclosure contemplates a portable means to leverage a single device, e.g., a smartphone, as a primary computing device for various information workers, though in particular those that cannot be tethered to a single desktop such as sales and consulting professionals. The portability of the bi-directional projection unit 24, as well as the overall apparatus 10, can be leveraged for improved mobility. The display of the mobile device 12 can be mirrored and expanded to the clamshell structure 16, and a larger virtual keyboard expands the input capabilities to a wider range provided by the same clamshell structure 16.

One example use case contemplated the user performing demonstrations of content from the mobile device 12 to a large room or audience. The incorporated pico projector 44 is envisioned to project the video output from the mobile device to a large, distant surface. Additionally, another use case contemplates a more intimate setting, e.g., two people, in which the video output is projected to a nearby surface. Still another use case contemplates a single user in which the video output is projected on to the clamshell structure 16. In various embodiments of the present disclosure, the mobile device 12 is envisioned to serve as the primary computing device as a slim and ultralight alternative to laptop computers and other full-featured mobile devices such as tablets and phablets.

The particulars shown herein are by way of example and for purposes of illustrative discussion of the embodiments of the mobile device display and input expansion apparatus and are presented in the cause of providing what is believed to be the most useful and readily understood description of the principles and conceptual aspects. In this regard, no attempt is made to show details with more particularity than is necessary, the description taken with the drawings making apparent to those skilled in the art how the several forms of the present disclosure may be embodied in practice.

What is claimed is:

1. A mobile device input and output display expansion apparatus, comprising:
   a clamshell structure including a first section in a hinged relationship to a second section, the first section defining a flat display projection surface and the second section defining a docking recess and a keyboard projection surface; and
   a bi-directional projection unit including:
      a communications module connectible to a mobile device, output display signals from the mobile device and input signals to the mobile device being relayed between the mobile device and the bi-directional projection unit by the communications module,
      a display output projector connected to the communications module, the output display signal from the mobile device being converted to a first series of light outputs corresponding to the output display signal and projected against the flat display projection surface of the clamshell structure,
      a virtual keyboard projector generating a second series of light outputs corresponding to a virtual keyboard key arrangement and projected against the keyboard projection surface of the second section of the clamshell structure;
      a key input sensor covering the virtual keyboard key arrangement to detect haptic input at specific positions along the virtual keyboard key arrangement, the key input sensor generating a key input value corresponding to a specific key of the virtual keyboard key arrangement at which the haptic input is detected, the key input value being relayed to the mobile device by the communications module, and
      a housing at least partially received in the docking recess and defining a first edge with a display projector aperture to the display output projector and an opposed second edge with a keyboard projection aperture to the virtual keyboard projector and an input sensor aperture to the key input sensor.

2. The apparatus of claim 1, further comprising an air circulator mounted in the housing with an output facing an exterior of the housing.

3. The apparatus of claim 1, wherein the communications module of the bi-directional projection unit includes a wireless transceiver, the wireless transceiver establishing a wireless communications link with the mobile device.

4. The apparatus of claim 1, wherein the communications module of the bi-directional projection unit includes an interface port receptive to an input/output link cable connectible to the mobile device.

5. The apparatus of claim 1, wherein the key input sensor is a visible light imaging sensor capturing a continuous sequence of images at discrete sampling instances and a visual field encompassing the virtual keyboard key arrangement as projected on to the keyboard projection surface.

6. The apparatus of claim 1, further comprising a sensor mounting platform with the key input sensor attached thereto and being extendable above a top plane of the housing.

7. The apparatus of claim 1, wherein the housing defines a recess receptive to the mobile device.

8. The apparatus of claim 1, further comprising a printed circuit board enclosed within the housing, the communications module, the display output projector, the virtual keyboard projector, and the key input sensor being mounted to the printed circuit board.

9. The apparatus of claim 8, further comprising one or more thermal conductors mounted to at least one or both of the virtual keyboard projector and display output projector.

10. The apparatus of claim 1, wherein the virtual keyboard projector includes a laser emitter.

11. The apparatus of claim 10, wherein the key input sensor is an infrared detector capturing breaks in laser emissions from the laser emitter corresponding to a physical interference thereof by the haptic input.

12. A mobile device input and output display expansion apparatus, comprising:
   a communications module connectible to the mobile device, output display signals from the mobile device and input signals to the mobile device being relayed between the mobile device and the bi-directional projection unit by the communications module;
   a display output projector connected to the communications module, the output display signal from the mobile device being converted to a first series of light outputs corresponding to the output display signal;
   a virtual keyboard projector generating a second series of light outputs corresponding to a virtual keyboard key arrangement; and
   a key input sensor defining a sensing coverage area encompassing a projection of the virtual keyboard key arrangement to detect user input at specific positions thereon, the key input sensor generating a key input value corresponding to a specific key of the virtual keyboard key arrangement at which the user input is detected, the key input value being relayed to the mobile device by the communications module.

13. The apparatus of claim 12, further comprising
   a housing defining a first edge with a display projector aperture to the display output projector and an opposed second edge with a keyboard projection aperture to the virtual keyboard projector and an input sensor aperture to the key input sensor.

14. The apparatus of claim 13, further comprising
a printed circuit board enclosed within the housing, the communications module, the display output projector, the virtual keyboard projector, and the key input sensor being mounted to the printed circuit board.

15. The apparatus of claim 13, wherein the housing defines a recess receptive to the mobile device.

16. The apparatus of claim 13, wherein the communications module includes a wireless transceiver, the wireless transceiver establishing a wireless communications link with the mobile device.

17. The apparatus of claim 13, wherein the communications module of the includes an interface port receptive to an input/output link cable connectible to the mobile device.

18. The apparatus of claim 13, further comprising
a sensor mounting platform with the key input sensor attached thereto and being extendable above a top plane of the housing.

19. A mobile device input and output display expansion apparatus comprising:
a data processor;
a device housing defined by a front face and a plurality of edges;
a primary display mounted to the device housing as a part of the front face thereof;
a display output projector connected to the data processor, an output display signal from the processor being converted to a first series of light outputs corresponding to the output display signal, an output window of the display output projector being defined in a first one of the plurality of edges of the device housing;
a virtual keyboard projector generating a second series of light outputs corresponding to a virtual keyboard key arrangement, an output window of the virtual keyboard projector defined in a second one of the plurality of edges of the device housing; and
a key input sensor defining a sensing coverage area encompassing a projection of the virtual keyboard key arrangement to detect user input at specific positions thereon, the key input sensor generating a key input value corresponding to a specific key of the virtual keyboard key arrangement at which the user input is detected, the key input value being passed to the data processor, a sensor window of the key input sensor defined in the second one of the plurality of edges of the device housing.

20. The apparatus of claim 19, wherein the key input sensor is a visible light imaging sensor capturing a continuous sequence of images at discrete sampling instances and a visual field encompassing the virtual keyboard key arrangement.

21. The apparatus of claim 19, wherein the virtual keyboard projector includes a laser emitter.

22. The apparatus of claim 21, wherein the key input sensor is an infrared detector capturing breaks in laser emissions from the laser emitter corresponding to a physical interference thereof by the user input.

* * * * *